United States Patent
Geiser (10) Patent No.: US 7,396,001 B2
(45) Date of Patent: Jul. 8, 2008

(54) VALVE FOR ESSENTIALLY GASTIGHT CLOSING A FLOW PATH

(75) Inventor: Friedrich Geiser, Nueziders (AT)

(73) Assignee: Vat Holding AG, Haag (CH)

( * ) Notice: Subject to any disclaimer, the term of this patent is extended or adjusted under 35 U.S.C. 154(b) by 0 days.

(21) Appl. No.: 11/311,434

(22) Filed: Dec. 20, 2005

(65) Prior Publication Data

US 2007/0138424 A1    Jun. 21, 2007

(51) Int. Cl.
*F16K 1/16* (2006.01)
*F16K 25/00* (2006.01)

(52) U.S. Cl. .................................. 251/301; 251/193

(58) Field of Classification Search .............. 137/630, 137/630.12, 630.13, 630.14, 630.15; 251/301, 251/193, 158, 167, 195, 302
See application file for complete search history.

(56) References Cited

U.S. PATENT DOCUMENTS

| | | | | |
|---|---|---|---|---|
| 989,201 | A | * | 4/1911 | Snow ........................ 251/158 |
| 1,723,264 | A | * | 8/1929 | Wilson ....................... 251/177 |
| 1,904,467 | A | * | 4/1933 | Karnath ..................... 251/167 |
| 3,145,969 | A | | 8/1964 | von Zweck |
| 3,804,124 | A | * | 4/1974 | Finke et al. ............. 137/630.14 |
| 4,089,505 | A | * | 5/1978 | Anderle et al. .......... 251/129.11 |
| 4,408,634 | A | * | 10/1983 | Peacock ................. 137/630.12 |
| 5,577,707 | A | | 11/1996 | Brida |

(Continued)

FOREIGN PATENT DOCUMENTS

DE    1 264 191 B1    3/1968

(Continued)

*Primary Examiner*—John Rivell
*Assistant Examiner*—Andrew J Rost
(74) *Attorney, Agent, or Firm*—Rothwell, Figg, Ernst & Manbeck P.C.

(57) ABSTRACT

The invention relates to a valve, in particular a shuffle or sliding valve, for essentially gastight closing of a flow path (F). The valve includes a valve housing (1;1a) having a first wall (2) which has a first opening (3) and a first valve seat (4), a valve disk (5) having a closing side (6) with a sealing ring (7) and at least one drive (8). Through the drive (8), the valve disk (5) is pivotable or displaceable from an opened position (A) essentially parallel to the first valve seat (4), and the perpendicular distance between the valve disk (5), and the first valve seat (4) can be reduced so that, in the closed position (C), the flow path (F) is closed essentially gastight by an axially sealing contact between the sealing ring (7) and the first valve seat (4). The valve disk (5) includes an outer disk section (9), which is connected to the drive (8) and fixes the sealing ring (7) in the perpendicular direction to the first valve seat (4), and an inner disk section (10) which has an outer circumferential area (11) and which is mounted so as to be movable relative to the outer disk section (9) in a direction (Z) essentially perpendicular to the first valve seat (4). The outer circumferential area (11) is enclosed essentially gastight with an inner seal by the sealing ring (7). Thus, in the closed position (C), a pressure difference at the valve disk (5) acts essentially on the inner disk section (10) so that the inner disk section (10), decoupled from the outer disk section (9), is supported perpendicularly on a section of the valve housing (1), in particular the first valve seat (4) or a lateral groove (27).

13 Claims, 5 Drawing Sheets

U.S. PATENT DOCUMENTS

| | | |
|---|---|---|
| 6,089,537 A | 7/2000 | Olmsted |
| 6,416,037 B1 | 7/2002 | Geiser |
| 6,561,483 B2 | 5/2003 | Nakagawa |
| 6,561,484 B2 | 5/2003 | Nakagawa et al. |
| 6,629,682 B2 | 10/2003 | Duelli |
| 6,902,145 B2 * | 6/2005 | Latzer et al. ................ 251/170 |
| 7,004,453 B1 * | 2/2006 | Cheng ........................ 251/211 |
| 2005/0067603 A1 | 3/2005 | Lucas et al. |

FOREIGN PATENT DOCUMENTS

| | | |
|---|---|---|
| DE | 77 31 993 U | 1/1978 |
| DE | 34 47 007 C2 | 7/1985 |

* cited by examiner

VALVE FOR ESSENTIALLY GASTIGHT CLOSING A FLOW PATH

TECHNICAL FIELD OF THE INVENTION

The invention relates to a vacuum valve for essentially gastight closing of a flow path by swivelling or moving a valve disk over an opening and pressing the valve disk onto a valve seat surrounding the opening. Such valves are used in particular in vacuum technology and are referred to in particular as shuttle valves or sliding valves.

DESCRIPTION OF THE PRIOR ART

Valves of the type mentioned at the outset are known in different embodiments from the prior art and are used in particular in the area of IC and semiconductor manufacture, which must take place in a protected atmosphere, as far as possible without the presence of contaminating particles. Shuttle valves serve, for example, for controlling the gas flow between a process chamber and a vacuum pump. Sliding valves are arranged, for example, in connecting passages between manufacturing chambers of a manufacturing plant for semiconductor wafers or liquid crystal substrates, it being possible to open the connecting passages by means of the sliding valves for the transfer of highly sensitive semiconductor or liquid crystal elements from one manufacturing chamber to the next and to be closed gastight after the respective manufacturing step has been carried out.

In the case of a shuttle valve, in a first step, a generally round valve disk is swivelled rotationally over a generally likewise round opening from a position in which the opening is unobstructed to an intermediate position covering the opening. In the case of a sliding valve, the valve disk, like the opening, is generally rectangular and is moved in this first step linearly from a position in which the opening is not obstructed to an intermediate position covering the opening. In this intermediate position, the valve disk of the shuttle or sliding valve is in a position opposite to and a distance away from the valve seat surrounding the opening. In a second step, the distance between the valve disk and the valve seat is reduced so that the valve disk and the valve seat are pressed uniformly one onto the other and the opening is closed essentially gastight. This second movement is effected essentially in a direction perpendicular to the valve seat. As a result of the closing process taking place in two steps, the sealing ring between the valve disk and the valve seat is subjected to scarcely any shear forces which would destroy the sealing ring, since the movement of the valve disk in the second step takes place essentially linearly and perpendicularly to the valve seat.

The prior art discloses different drive systems for achieving this combination of a rotational movement of the valve disk in the case of the shuttle valve and a translational movement of the valve disk in the case of the sliding valve, parallel over the opening, and an essentially translational movement perpendicular to the opening, for example from U.S. Pat. No. 6,089,537 (Olmsted) for a shuttle valve and from U.S. Pat. No. 6,416,037 (Geiser) for a sliding valve.

The pressing of the valve disk onto the valve seat must be effected in a manner such that both the required gas tightness within the entire pressure region is ensured and damage to the sealing medium, in particular the sealing ring in the form of an O-ring, by application of excessively high pressure is avoided. In order to ensure this, known valves provide controlled contact pressure regulation of the valve disk as a function of the pressure difference prevailing between the two valve disk sides. Particularly in the case of large pressure variations or change from reduced pressure to excess pressure, or vice versa, a uniform force distribution along the entire circumference of the sealing ring cannot, however, always be ensured. In general, attempts are made to decouple the sealing ring from support forces which arise from the pressure applied to the valve. U.S. Pat. No. 6,629,682 (Duelli) proposes in this context a vacuum valve having a sealing medium which is composed of a sealing ring and an adjacent support ring, so that the sealing ring is essentially freed from support forces.

In order to achieve the required gas tightness, if appropriate both for excess pressure and for reduced pressure, some known shuttle valves or sliding valves provide, in addition to or alternatively to the second movement step, a valve ring which is displaceable perpendicularly to the valve disk, surrounds the opening and is pressed onto the valve disk for the gastight closing of the valve. Such valves having valve rings actively displaceable relative to the valve disk are disclosed, for example, in DE 1 264 191 B1, DE 34 47 008 C2, U.S. Pat. No. 3,145,969 (von Zweck) and DE 77 31 993 U. U.S. Pat. No. 5,577,707 (Brida) describes a shuttle valve with a valve housing having an opening and a valve disk pivotable parallel over the opening and intended for controlling the flow through the opening. A valve ring which encloses the opening can be actively moved perpendicularly in the direction towards the valve disk by means of a plurality of springs and compressed air cylinders. A possible further development of this shuttle valve is proposed in US 2005/0067603 A1 (Lucas et al.).

U.S. Pat. No. 6,561,483 (Nakagawa) and U.S. Pat. No. 6,561,484 (Nakagawa et al.) disclose vacuum valves in different embodiments which comprise a valve disk divided into two. A first disk section has an opening. A second disk section is connected by means of an extendable body to the first disk section. An actuator is arranged between the first and the second disk section so that the two disk sections can be moved actively toward one another and away from one another. The extendable body is in the form of bellows. The first disk section can be pressed against the valve seat by means of the actuator, the second disk section—particularly in the case of excess pressure on the valve seat side—optionally being supported on an opposite side of the valve housing. The design of the vacuum valves described is relatively complex especially owing to the necessity of using a bellows or a plurality of sealing rings for sealing the first disk section from the second disk section and from the valve seat and is disadvantageous to maintain and susceptible to soiling.

For the gastight sealing of the known valves having a valve ring, at least two sealing rings, in particular O-rings or an additional bellows are required. In the case of a valve having a valve ring, in particular an axially sealing ring which is arranged between the valve disk and the valve ring or the opposite valve seat, and a radially sealing ring—in particular externally sealing ring arranged between the valve ring and a edge section of the opening of the valve housing—which ensures a gastight seal between the valve ring and the valve housing along its region of movement are required. Since sealing rings are susceptible and sensitive wearing parts, the use of a plurality of sealing rings is disadvantageous.

A further disadvantage of such valves having an actively adjustable valve ring is the relatively complicated and bulky design of the valve, the necessity of a complex control of the contact pressure and the presence of a plurality of moving parts in the flow channel, which complicate maintenance and cleaning of the valves.

Especially because of the field of use of shuttle and sliding valves between process chambers and vacuum pumps in long production plants, as flat a design as possible of the valve with respect to the distance from opening to opening is required, for example, in order to keep the transport paths of the parts or gasses and the total internal gas volume as small as possible and to arrange the individual components of the production plant as close together as possible and thus to permit a compact design of the production plants. In particular valves with an actively adjustable valve ring or valve disk sections meet this requirement only to an insufficient extent for numerous applications.

OBJECT OF THE INVENTION

It is therefore an object of the invention to solve the problems described above and to provide a valve of the type mentioned at the outset which has a simple and compact design, is easy to maintain and is capable of withstanding high pressure loads—optionally active on both sides.

SUMMARY OF THE INVENTION

This object is achieved by realizing the characterizing features disclosed herein. Features which further develop the invention in an alternative or advantageous manner are further described herein.

The valve according to the invention for essentially gastight closing of a flow path has a valve housing having a first wall which has a first opening for the flow path and a first valve seat surrounding the first opening. The first opening has, for example, a circular cross-section or a rectangular cross-section with rounded corners. A central axis of the first opening is defined, for example, by the longitudinal path of the opening, by the path of a connection arranged on the opening, by the connecting line with any second opening or by the area of the valve seat. In generally functional terms, a valve seat is to be understood as meaning a section which acts as a sealing area or support area in the wall, on which a further area acting as a sealing area or support area can rest. The valve housing may also be formed by the wall alone. The flow path is the regular, blockable flow path of a gaseous or liquid medium through the opening and the valve.

Furthermore, the valve comprises a valve disk by means of which the first opening can be closed and opened again. The valve disk has at least one closing side on which a sealing ring corresponding to the first valve seat and capable of making gastight contact with it is arranged. The sealing ring is fixed to an edge region of the closing side—in particular by means of vulcanization—and, for example, as in the form of an O-ring. The closing disk has, for example, a round or rectangular cross-section. The dimension of the closing side permits closing of the first opening by overlapping and placing on the first opening.

The valve has at least one drive by means of which the valve disk can be swivelled or moved essentially parallel to the first valve seat over the cross-section of the first opening and can thus be brought from an opened position in which the flow path is unobstructed to an intermediate position—and vice versa. In this intermediate position, the closing side of the valve disk is in a position opposite to the first valve seat, a distance away or making gentle contact. If the valve is a shuttle valve, the drive is formed in such a way that the valve disk is rotationally pivotable essentially parallel over the cross-section of the first opening about an adjustment axis which is in particular parallel to the opening axis, while the drive in the case of a sliding valve moves the valve disk translationally essentially parallel in the form of a linear displacement over the cross-section of the first opening. Other, in particular combined movement variants for positioning the valve disk in the intermediate position are known from the prior art and are likewise possible.

By means of the drive or by means of an additional drive, the perpendicular distance between the valve disk and the first valve seat, starting from the intermediate position, can be reduced so that, in a closed position, the flow path is closed essentially gastight by an axially sealing contact between the sealing ring and the first valve seat. This is effected in particular by a perpendicular movement of the valve disk with its closing side on to the valve seat. In order to avoid shear forces when the sealing ring is pressed onto the valve seat, this movement should be effected as far as possible linearly and perpendicularly to the valve seat. Pressing on by means of a pivot movement is also possible, the pivot axis being a distance away from the opening so that a quasi-linear movement on the valve disk takes place during pressing on. Alternatively or additionally, it is possible to reduce the distance between the valve disk and the first valve seat by moving the valve seat in the direction toward the closing side of the valve disk. In this embodiment, a movement of the valve disk perpendicularly to the valve seat can be omitted. Different drive variants for achieving the at least two stage movement described are known from the prior art and are not explained further.

The kinematic connection of the valve disk to the drive is effected, for example, by means of an arm or connecting rod.

When radial and axial direction and sealing effects are discussed in relation to the valve disk in the context of the invention, this relates not only to a circular cross-section of the opening or of the valve disk including its sections but also to other, for example rectangular, cross-sections. In the latter case, radial is to be understood as meaning a direction from the inside to the outside and, conversely, parallel to the front surface, plane of the disk or plane of the valve seat, and axial is to be understood as meaning a direction perpendicular thereto.

According to the invention, the valve disk is divided into at least two sections, namely an outer disk section and an inner disk section. The outer disk section is coupled to the drive and fixes the sealing ring in the perpendicular direction to the first valve seat so that the sealing ring is present in an axially sealing manner perpendicularly between the two parts when the valve disk is pressed onto the valve seat, or vice versa, and remains coordinated with the valve disk on releasing the connection. The inner disk section has an outward-facing outer circumferential area and—in the closed position of the valve—a front area which is essentially parallel to the first valve seat, can be supported on the valve seat or another section of the valve housing and is present on the closing side of the valve disk.

The inner disk section is mounted, relative to the outer disk section, so as to be movable essentially perpendicularly to the first valve seat and essentially parallel to the opening axis and is thus decoupled from the outer disk section within a certain range of movement in the direction of the opening axis. The outer circumferential area is enclosed by the sealing ring essentially gastight with an inner seal. Thus, the sealing ring performs two sealing functions. Firstly, it seals the connection between the inner and the outer disk section in the radial direction and secondly it seals the outer disk section from the valve seat in the axial direction in the closed position of the valve. This has considerable advantages with respect to the complexity of the design and the maintainability of the valve since a single sealing ring performs the function of two sealing rings.

In an embodiment of the invention, the outer disk section has, on the closing side, in an edge region enclosing the inner disk section, a recess which runs around the inside, holds the sealing ring and has an undercut fixing the sealing ring in the perpendicular direction to the first valve seat. The undercut ensures fixing of the sealing ring on the outer disk section perpendicular to the valve seat. It is possible additionally to create a strong connection between the sealing ring and the outer disk section by means of vulcanization.

In the closed position, a pressure difference, in particular a relative reduced pressure, acts on the closing side—i.e. a relative excess pressure acts on the opposite side—of the valve disk, essentially on the inner disk section, as a result of the perpendicular decoupling of the outer disk section from the inner disk section. The inner disk section is thus supported perpendicularly, and in a manner essentially decoupled from the outer disk section, on a section of the valve housing, in particular the first wall, especially the first valve seat, and/or for example, by means of a support frame which engages a groove formed in the valve housing, on the groove of the valve housing.

This decoupling of the two disk sections has substantial advantages for the sealing behavior, the maximum load capacity, the design, the dimensioning and the wear of the valve. Since, owing to the pressure difference, scarcely any forces act on the outer disk section which carries the sealing ring, but only on the decoupled inner disk section supported on the valve housing, the outer disk section scarcely performs a support function but mainly the sealing function. Thus, both the drive of the valve disk and the sealing ring are relieved of pressures acting on the valve disk. Contact pressure regulation of the valve disk, regulated as a function of the pressure difference prevailing at the valve, can be omitted since the contact pressure need correspond only to the sealing force required for achieving the axial seal.

In a further development of the invention, the valve disk comprises resilient means, in particular at least one spring, which are arranged in such a way and act between the outer disk section and the inner disk section in such a way that the inner disk section is pressed within its range of movement in the starting position in the direction of the first valve seat and, in the closed position with relative pressure equality at the valve, rests directly or indirectly on the valve housing, in particular on the first valve seat or a lateral surface of the groove. If there is a change from the state of pressure equality to reduced pressure or excess pressure on the closing side, the inner disk section already resting on the valve housing remains unmoved and an excessive mechanical load is avoided.

In a further, advantageous embodiment, the valve housing additionally has, in an essentially parallel opposite position a distance away relative to the first wall and the second opening, a second wall having a second opening for the flow path and a second valve seat surrounding the second opening. The valve disk is pivotable or displaceable between the first opening and the second opening. The driving of the valve disk and the opening and closing of the first opening are effected as described above. In the closed position of the valve, the second opening is present on that side of the valve disk which is opposite the closing side. In this embodiment, the inner disk section is formed in such a way that, in the closed position with a relative excess pressure on the closing side of the valve disk, the inner disk section is supported perpendicularly, essentially decoupled from the outer disk section, on the second valve seat. For this purpose, the inner disk section has, for example, a support frame which extends perpendicularly to the first valve seat and by means of which support on the second valve seat occurs in the case of relative excess pressure. Consequently, in the closed position, the possible relative range of movement of the inner disk section is limited on one side of the valve disk by support of the front area on the first valve seat and on the other side of the valve disk by support of the support frame of the inner disk section on the second valve seat. As a result of this, the valve has a high load capacity on both sides. A transition from reduced pressure to excess pressure and vice versa results in a change of the support areas of the inner disk section without the contact pressure of the outer disk section with its sealing ring on the first valve seat being influenced thereby. Thus, the valve according to the invention has a high load capacity on both sides without considerable loading of the drive or of a sealing area.

A similar effect can also be achieved by an inner lateral groove in the valve housing, which groove is formed and arranged in such a way that at least a partial section of the inner disk section, in particular a support frame arranged on the inner disk section, projects into the lateral groove in the closed position and the inner disk section is supported on the valve housing on a lateral area—in particular alternately both opposite lateral areas—of the lateral groove. Further developments for supporting the inner disk section on the valve housing are of course possible.

BRIEF DESCRIPTION OF THE DRAWINGS

The valve according to the invention is described in more detail below purely by way of example with reference to specific working examples shown schematically in the drawings, further advantages of the invention also being discussed. In some cases, reference numerals of figures already described above are used in the description of the individual figures, and individual diagrams are explained in relation to one another. Specifically.

DESCRIPTION OF THE PREFERRED EMBODIMENTS

Figure 1:
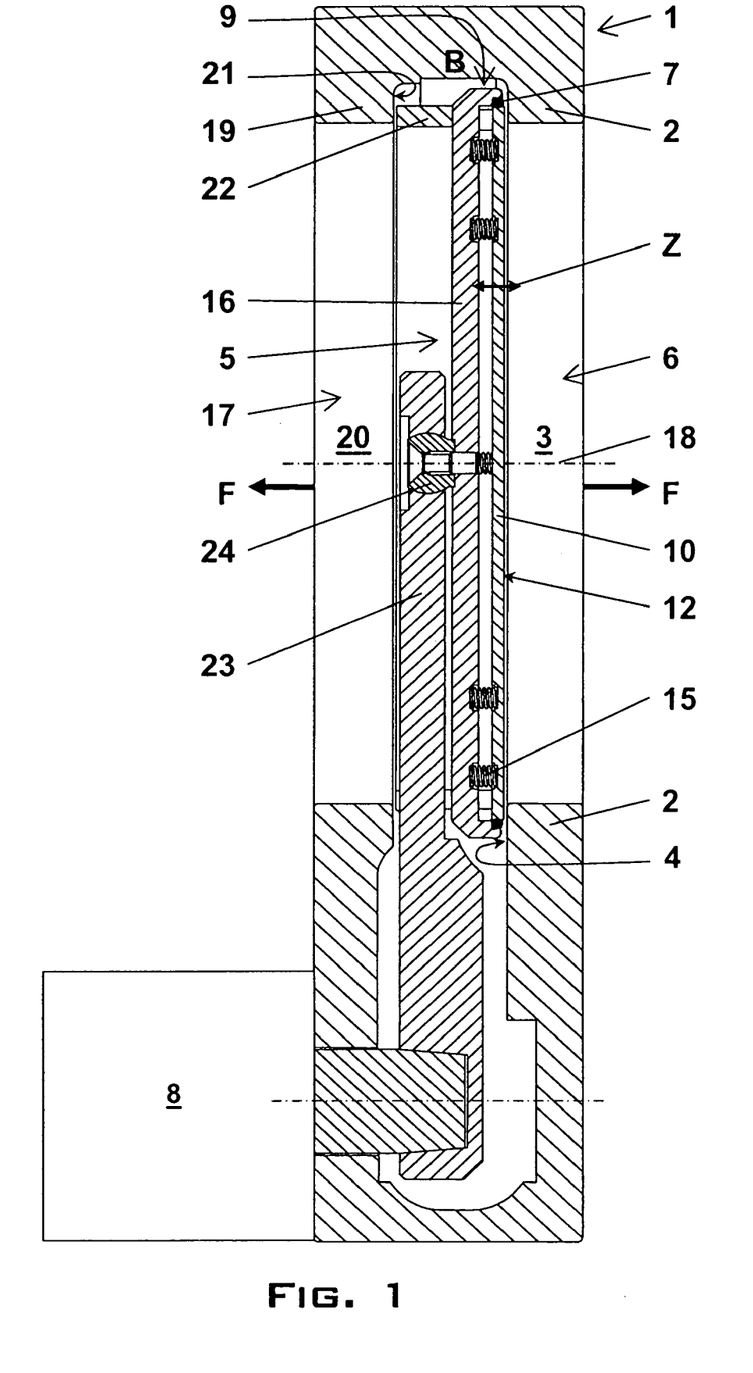
FIG. 1 shows a valve according to the invention in the intermediate position in a cross-section.
Figure 3:
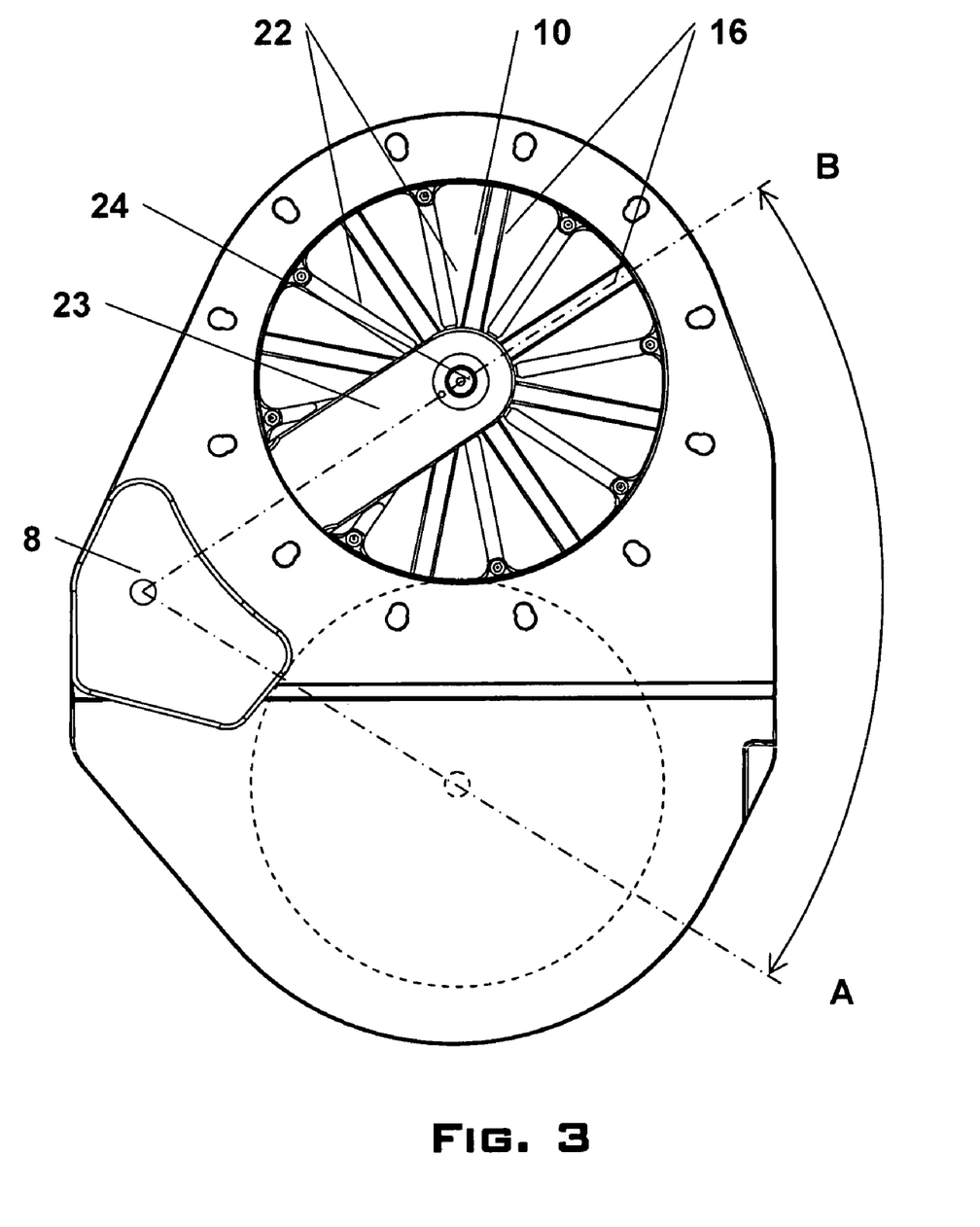
FIG. 3 shows the valve according to the invention in the intermediate position and opened position in a plan view.

FIG. 1 shows a possible embodiment of the valve according to the invention in the form of a shuttle valve. In a valve housing 1 having two walls opposite one another a distance apart, a first wall 2 and a second wall 19, two openings likewise opposite one another and having a round cross-section, a first opening 3 and a second opening 20, are formed, which openings form a flow path F leading through the valve for a gas or fluid. The two openings 3 and 20 have a common opening axis, the central axis 18 of the first opening 3. A first valve seat 4 which surrounds the first opening 3 and is formed by a flat, defined area of the first wall 2 and through whose plane the central axis 18 passes perpendicularly is formed on the inner areas of the first wall 2. Also present on the inner area of the second wall 19, parallel to the first valve seat 4, is a second valve seat 21. A drive 8 which is connected by means of an arm 23 to a valve disk 5 is arranged on the valve housing 1. The valve disk 5 is pivotable by means of the drive 8 between an opened position A as shown by a dashed line in FIG. 3, and an intermediate position B, cf. likewise FIG. 3 and FIG. 1, parallel to the walls 2 and 19 and the valve seats 4 and 21. In the opened position A the valve disk 5, whose cross-section can cover the first opening 3, opens the flow path F and the valve is completely opened. In the intermediate position B, as shown in FIG. 1, the valve disk 5 covers the first opening 3 and is therefore between the first opening 3 and the second opening 20, the valve disk 5 being present with its closing side 6 opposite the first valve seat 4 and a distance away therefrom.

Figure 2:
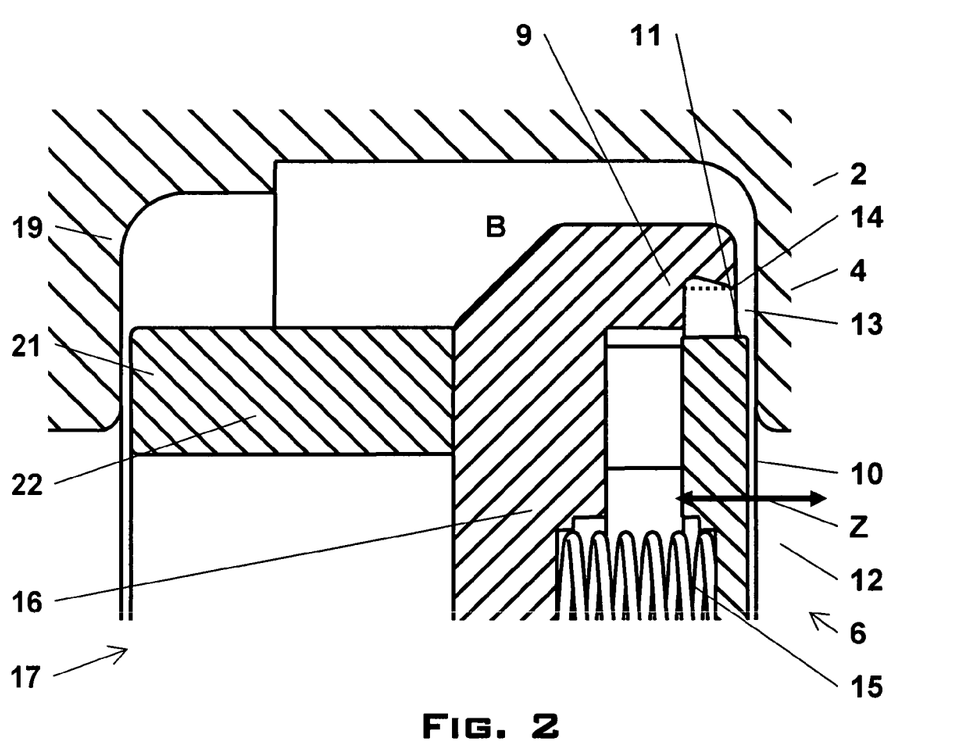
FIG. 2 shows a recess without a sealing ring in a detailed view from FIG. 1.
Figure 4A:
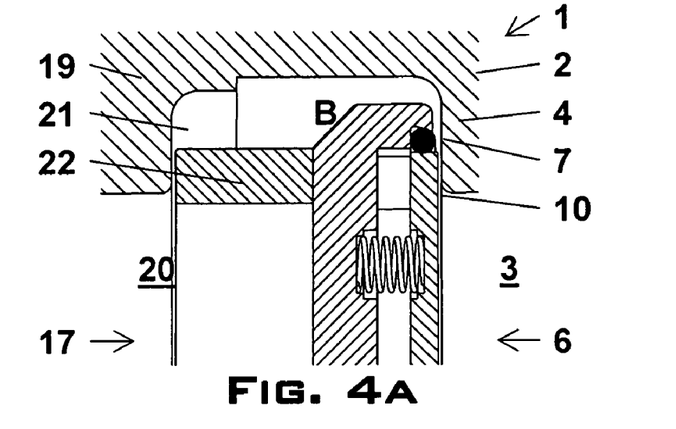
FIG. 4a shows the valve according to the invention in the intermediate position in a detailed view.

The valve disk 5 is divided into two sections, namely an outer disk section 9 and an inner disk section 10. The outer disk section 9 is connected by means of a strut system 16 extending radially from the outside to the inside and consisting of eight individual struts, cf. FIGS. 1 and 3, on the side 17 opposite the closing side 6, to the arm 23 which is coupled to the drive 8, in a central region located close to the central axis 18 of the first opening 3. The connection between the arm 23 and the strut system 16 is effected by means of a ball joint 24. The inner disk section 10 is in the form of a round pressure plate having an outer circumferential area 11, cf. FIG. 2, and a front area 12 essentially parallel to the first valve seat 4 on the closing side 6. The outer disk section 9 has, on the closing side 6, in an edge region enclosing the inner disk section 10, a recess 13 which runs around the inside and in which an all-round sealing ring 7 in the form of an O-ring is present, as shown in FIG. 1 and FIG. 4*a*, a detailed view of FIG. 1. For illustrative reasons, the recess 13 is shown without the sealing ring 7 in FIG. 2. The sealing ring 7 is fixed on the outer disk section 9 in a perpendicular direction to the first valve seat 4 or parallel to the central axis 18 by forming an undercut 14 holding the sealing ring 7 in the recess 13. The recess 13 is formed radially inward by the outer circumferential area 11 of the inner disk section 10 so that the outer circumferential area 11 is enclosed essentially gastight by the sealing ring 7 with an inner seal. The inner disk section 10 is mounted so as to be movable relative to the outer disk section 9 in a direction Z essentially perpendicular to the first valve seat 4. A plurality of springs 15 between the individual struts of the strut system 16, which are coordinated with the outer disk section 9, and the inner disk section 10 result in the inner disk section 10 in the starting stage being pressed in the perpendicular direction towards the first valve seat 4, as illustrated in the detailed view 4*a*, which shows the valve disk 5 in the intermediate position B.

For closing the valve, the valve disk 5 is moved by means of the drive 8 from the intermediate position B in a direction toward the first valve seat 4, the perpendicular distance between the valve disk 5 and the first valve seat 4 being reduced in such a way that the sealing ring 7 is pressed onto the first valve seat 4 so that an axially sealing contact between the sealing ring 7 and the first valve seat 4 results. The ball joint 24 ensures that the valve disk 5 is aligned parallel to the first valve seat 4 on application of pressure. Since both the outer disk section 9 is sealed with respect to the valve seat 4 and the inner disk section 10 is sealed with respect to the outer disk section 9 by means of the one sealing ring 7, the flow path F is closed essentially gastight. The valve disk 5 is now in the closed position C as shown in FIGS. 4*b* and 4*c*.

Figure 4B:
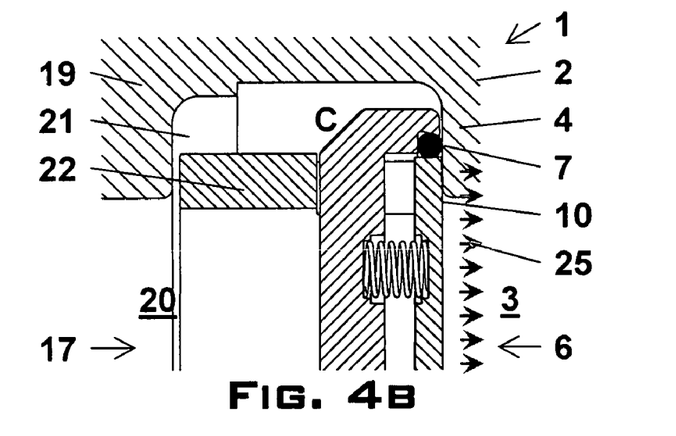
FIG. 4b shows the valve according to the invention in the closed position in the case of reduced pressure on the closing side in the detailed view.
Figure 4C:
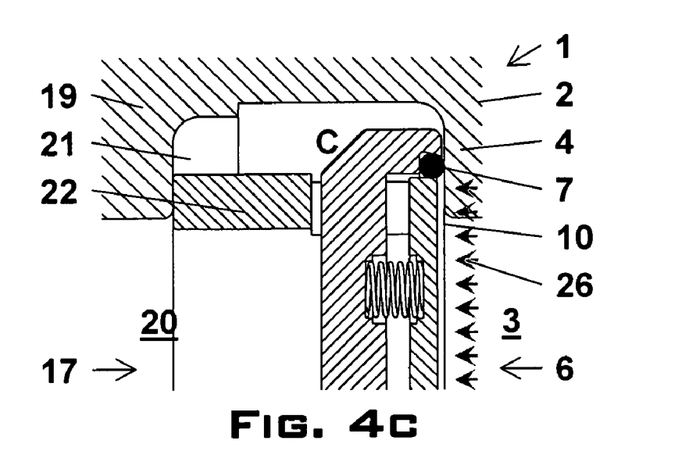
FIG. 4c shows the valve according to the invention in the closed position in the case of excess pressure on the closing side in the detailed view.

In the state of relative pressure equality between the first opening 3 and the second opening 20, the inner disk section rests on the first valve seat 4, owing to the spring force of the springs 15 (cf. FIG. 4*b*).

In the case of a pressure difference between the first opening 3 and the second opening 20, the pressure acts essentially on the inner disk section 10, movable along the perpendicular direction Z, the outer disk section 9 as well as the arm 23 and the drive 8 remaining free of load.

If a relative reduced pressure 25, indicated by the arrows in FIG. 4*b*, prevails on the closing side 6 of the valve disk 5, the inner disk section 10 is supported perpendicularly, essentially decoupled from the outer disk section 9, on the first valve seat 4. The force due to the pressure difference acts mainly on the inner disk section 9 and the first valve seat 4 having a high load capacity. Since the drive components of the valve remain free of load, the valve is capably of withstanding large pressure differences.

If there is a relative excess pressure 26, indicated by the arrows in FIG. 4*c*, on the closing side 6 of the valve disk 5, the inner disk section 10—decoupled from the outer disk section 9—moves from its position resting on the first valve seat 4 in the perpendicular direction to the opposite second valve seat 21 until a support frame 22 (cf. also FIG. 3) which extends perpendicularly to the second valve seat 21 and is coordinated with the inner disk section 10 rests on the second valve seat 21 and thus supports the inner disk section 10 on the second valve seat 21.

As a result of this development of the valve disk 5, which is divided into two, the valve has a high load capacity on both sides without a drive and holding system with large dimensions having to support the valve disk in the flow direction. In order to keep the perpendicular path of the inner disk section 10 small in the case of a pressure reversal and a consequent change of the support area from the first valve seat 4 to the second valve seat 21, it is advantageous to keep the play between the two valve seats 4 and 21 small.

As is evident from the figures, it is not just the number of wearing parts that is kept small by the use of a sealing ring. In addition, small dimensioning of the valve and a small distance from opening to opening are possible.

Figure 5A:
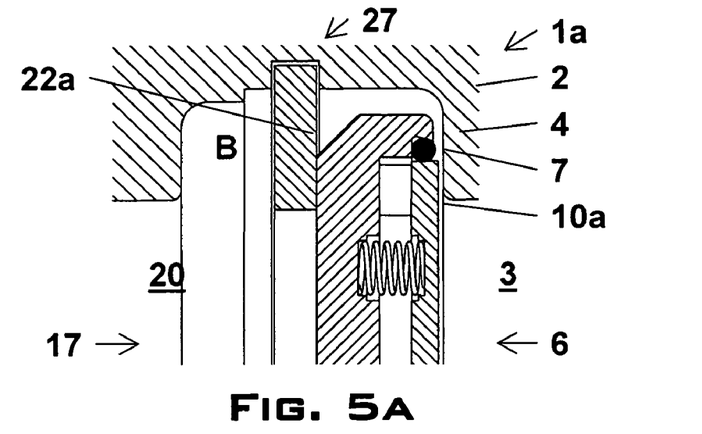
FIG. 5a shows an alternative embodiment of the valve according to the invention in the intermediate position in a detailed view.
Figure 5B:
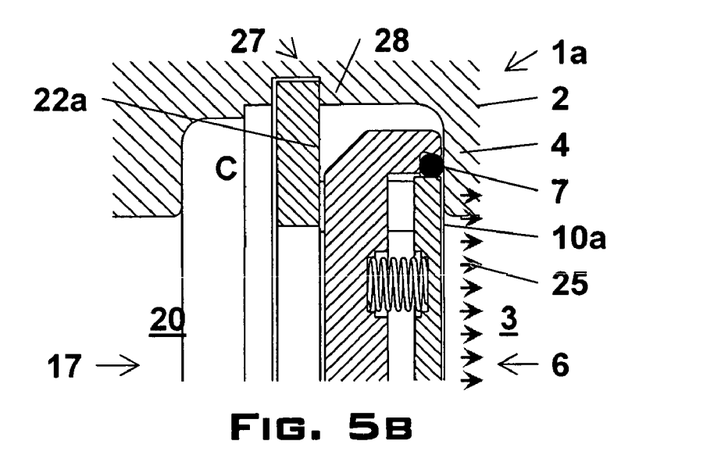
FIG. 5b shows the alternative embodiment in the closed position in the case of reduced pressure on the closing side in the detailed view.
Figure 5C:
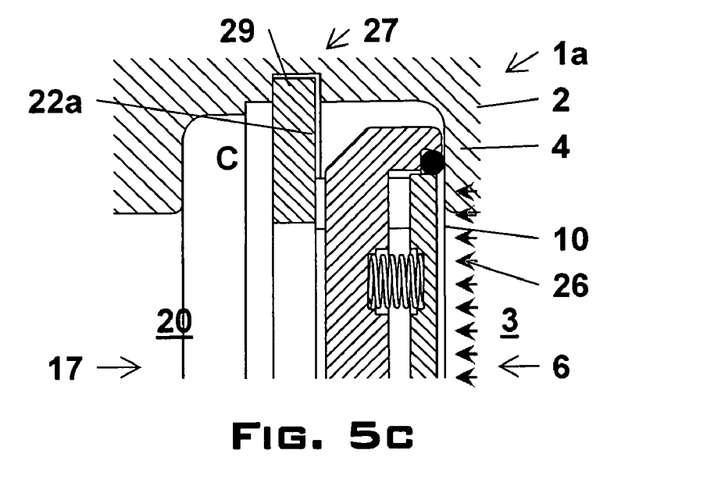
FIG. 5c shows the alternative embodiment in the closed position in the case of excess pressure on the closing side in the detailed view.

FIGS. 5*a*, 5*b* and 5*c* illustrate an alternative embodiment of a valve according to the invention. Since numerous components of this alternative embodiment are identical to those of the first embodiment described above and views which correspond to FIGS. 4*a*, 4*b* and 4*c* are used, the explanation of components and reference numerals already mentioned above will be dispensed with in part and reference numerals of preceding figures will be employed in some cases.

An inner lateral groove 27 which extends all around a partial section of the valve disk 5 in its intermediate position B or closed position C is formed in the valve housing 1*a*. This inner partial circumferential groove 27 has a rectangular cross-section with a first lateral area 28 in the direction of the closing side 6 toward the first opening 3 and a second lateral area 29 in the direction of the side 17 opposite the closing side and toward the second opening 20, cf. FIGS. 5*b* and 5*c*. The groove 27 is formed and arranged in such a way that, on pivoting or displacing the valve disk 5 from the open position A leaving the flow path F unobstructed to the intermediate position B, a support frame 22*a* arranged on the inner disk section 10*a* and extending radially in part is introduced into the groove 27, the support frame 22a being present in the opposite position, without contact and a distance away, relative to the first lateral area 28 and to the second lateral area 29, as shown in FIG. 5a, in the intermediate position B. Thus, at least a partial section of the inner disk section 10a, in the closed position C (cf. FIGS. 5b and 5c) in which the outer disk section 9 is pressed on to the first valve seat 4, projects into the lateral groove 27. If, in the closed position C, there is a relative reduced pressure 25, indicated by the arrows in FIG. 5b on the closing side 6 of the valve disk 5, the inner disk section 10a is supported perpendicularly, essentially decoupled from the outer disk section 9, by means of the support frame 22a on the first lateral area 28 of the groove 27 of the valve housing 1a, without their being any contact between the inner disk section 10a and the first valve seat 4. The force due to the pressure difference acts mainly on the inner disk section 9 and the first lateral area 28 of the groove 27, which lateral area has a high load capacity. Since the drive components of the valve remain free of load, the valve is capably of withstanding large pressure differences.

If, on the other hand, there is a relative excess pressure, indicated by the arrows in FIG. 5c, on the closing side 6 of the valve disk 5, the inner disk section 10a-decoupled from the outer disk section 9—moves from its position determined by the resting of the support frame 22a on the first lateral area 28 in the perpendicular direction away from the first valve seat 4 until the support frame 22a, which is coordinated with the inner disk section 10a, rests on the second lateral area 29 of the groove 27 and thus supports the inner disk section 10a on the valve housing 1a, cf. FIG. 5c.

Of course, it is possible for the valve described alternatively to be in the form of a sliding valve having a rectangular or other cross-section of the valve disk and the at least one opening. It is also possible to design the valve to act on one side, the valve seat on which the sealing ring comes to rest and that area of the valve housing which supports the inner disk section being located either on the same side or on opposite sides.

The invention claimed is:

1. A valve for essentially gastight closing of a flow path (F), comprising
   a valve housing (1,1a) having a first wall (2), which has a first opening (3) for the flow path (F) and a first valve seat (4) surrounding the first opening (3),
   a valve disk (5) having a closing side (6) on which a sealing ring (7) corresponding with the first valve seat (4) is arranged, and
   at least one drive (8), by means of which
      the valve disk (5) is pivotable or displaceable from an opened position (A) in which the flow path (F) is unobstructed to an intermediate position (B) essentially parallel to the first valve seat (4) over the cross-section of the first opening (3) and
      the perpendicular distance between the valve disk (5) and the first valve seat (4) can be reduced from the intermediate position (B) to a closed position (C) in such a way that the flow path (F) is closed essentially gastight by an axially sealing contact between the sealing ring (7) and the first valve seat (4),
   wherein the valve disk (5) has
      an outer disk section (9) which
         is connected to the drive (8) and
         fixes the sealing ring (7) in the perpendicular direction to the first valve seat (4), and
      an inner disk section (10),
         which has an outer circumferential area (11), which is mounted so as to be movable relative to the outer disk section (9) and thus being decoupled from the outer disk section (9) within a certain range of movement in a direction (Z) essentially perpendicular to the first valve seat (4) and
         whose outer circumferential area (11) is enclosed essentially gastight with an inner seal by the sealing ring (7), wherein an essential gastight contact in radial direction is provided between the sealing ring (7) and the outer circumferential area (11) within said certain range of movement,
   wherein, in the closed position (C), a pressure difference at the valve disk (5) acts essentially on the inner disk section (10), and the inner disk section (10) is supported perpendicularly and in a manner essentially decoupled from the outer disk section (9) on the valve housing (1;1a).

2. The valve as claimed in claim 1, wherein the outer disk section (9) has, on the closing side (6) in an edge region enclosing the inner disk section (10), a recess (13) which runs around the inside, holds the sealing ring (7) and has an undercut (14) fixing the sealing ring (7) in the perpendicular direction to the first valve seat (4).

3. The valve as claimed in claim 1, wherein the sealing ring (7) is in the form of an O-ring.

4. The valve as claimed in claim 1, wherein, in the case of a relative reduced pressure (25) on the closing side (6) of the valve disk (5), the inner disk section (10) is supported on the first valve seat (4) of the valve housing (1).

5. The valve as claimed in claim 1, wherein
   the valve housing (1) has, in an essentially parallel position opposite to the first wall (2) and to the first opening (3) and a distance away, a second wall (19) having a second opening (20) for the flow path (F) and a second valve seat (21) surrounding the second opening (20),
   the valve disk (5) is pivotable or displaceable between the first opening (3) and the second opening (20) and
   the inner disk section (10) is formed in such a way that, in the closed position (C) with a relative excess pressure (26) on the closing side (6) of the valve disk (5), the inner disk section (10) is supported perpendicularly, essentially decoupled from the outer disk section (9), on the second valve seat (21).

6. The valve as claimed in claim 5, wherein the inner disk section (10) has a support frame (22) which extends perpendicularly to the second valve seat (21) and by means of which support on the second valve seat (21) is provided in the case of the relative excess pressure (26).

7. The valve as claimed in claim 1, comprising an inner lateral groove (27) in the valve housing (1a), which groove is formed and arranged in such a way that
   at least a partial section of the inner disk section (10)—in particular a support frame (22a) arranged on the inner disk section (10)—projects in the closed position (C) into the lateral groove (27) and
   the inner disk section (10) is supported on the valve housing (1a), on a lateral area (28;29) of the lateral groove (27).

8. The valve as claimed in claim 1, comprising resilient means, which are arranged in such a way—acting between the outer disk section (9) and the inner disk section (10)—that the inner disk section (10) in the closed position (C), with relative pressure equality at the valve, rests on the valve housing (1;1a).

9. The valve as claimed in claim 1, wherein the valve disk (5) has on the side (17) opposite to the closing side (6), a strut system (16) which connects the outer disk section (9) to an arm (23), which is connected to the drive (8), in a central region located close to the central axis (18) of the first opening (3).

10. The valve as claimed in claim 9, comprising a ball joint (24) which connects the arm (23) to the strut system (16) in such a way that the valve disk (5) is aligned parallel with the first valve seat (4) on pressing the sealing ring (7) onto the first valve seat (4).

11. The valve as claimed in claim 1, wherein the valve is in the form of a shuttle valve and the drive (8) is formed in such a way that the valve disk (5) is pivotable essentially parallel over the cross-section of the first opening (3).

12. The valve as claimed in claim 1, wherein the valve is in the form of a sliding valve and the drive (8) is formed in such a way that the valve disk (5) is displaceable essentially parallel over the cross-section of the first opening (3).

13. The valve of claim 8 wherein the resilient means comprises at least one spring.

* * * * *